(No Model.)
A. MILLER.
LUNCH BUCKET.
No. 469,162. Patented Feb. 16, 1892.
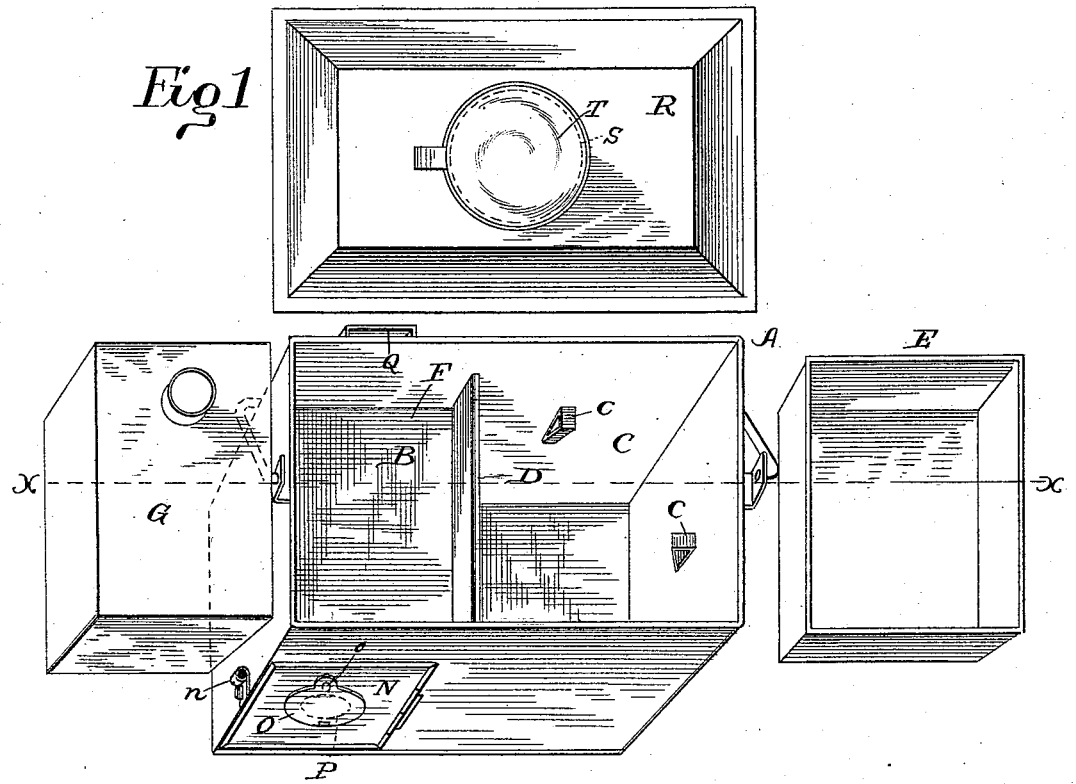
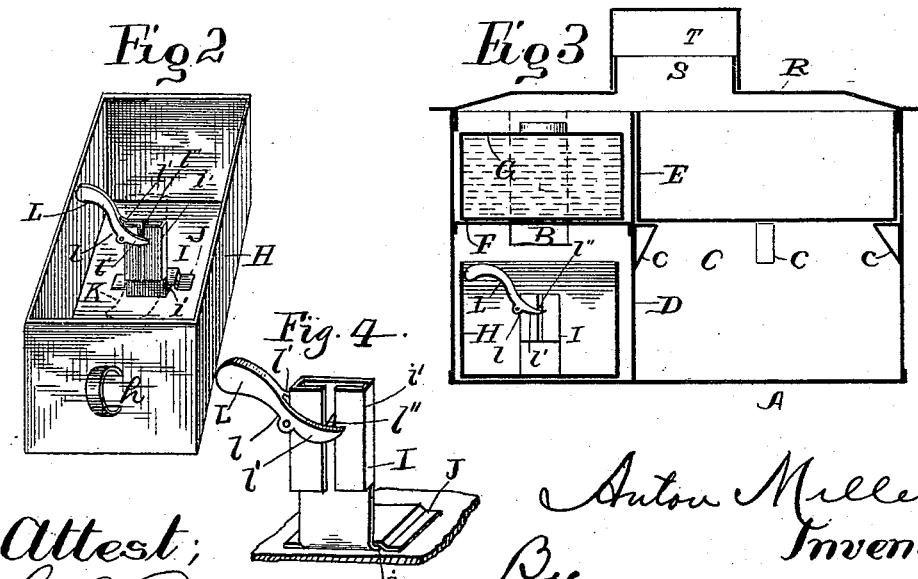
Attest;
C. C. Burdine
C. S. Frye
Anton Miller
Inventor;
By W. T. Fitz Gerald & Co.,
att'ys

UNITED STATES PATENT OFFICE.

ANTON MILLER, OF LA CROSSE, WISCONSIN.

LUNCH-BUCKET.

SPECIFICATION forming part of Letters Patent No. 469,162, dated February 16, 1892.

Application filed September 8, 1891. Serial No. 405,114. (No model.)

*To all whom it may concern:*

Be it known that I, ANTON MILLER, a citizen of the United States, residing at La Crosse, in the county of La Crosse and State of Wisconsin, have invented certain new and useful Improvements in Lunch-Buckets; and I do hereby declare the following to be a full, clear, and exact description of the invention, such as will enable others skilled in the art to which it appertains to make and use the same.

My invention relates to improvements in lunch-buckets; and it consists of certain detailed features of construction, which will hereinafter be fully claimed, reference being had to the accompanying drawings, in which—

Figure 1 is a top perspective view of the bucket and inner sections removed. Fig. 2 is a perspective detail of the lamp. Fig. 3 is a transverse section of the bucket on the line $x\,x$, Fig. 1. Fig. 4 is a perspective detail view of the wick-support, &c.

Describing my invention in detail and designating the various parts by their respective letters of designation, A is the body proper, which may be made square, oblong, or other preferred form, and within which are mounted the various devices that will be hereinafter described.

Briefly stated, the object of my invention is to provide a means for warming the contents of the bucket and effect the same at a minimum cost of time and material. With this object in view I divide the body into the two unequal sections B C by the vertical partition D. The larger of these sections C has formed upon its sides the inwardly-reaching lugs c, upon which rests the removable tray E, as shown in Fig. 1. The compartment B is divided into two parts by the horizontal partition F, and it is under this partition that the lamp or other heating device is placed, while upon the upper surface of said partition rests the receptacle for the coffee or other liquid to be heated. It will be understood that the liquid may be placed directly in the compartment formed by the horizontal partition F and the upper edges of the section B, from which it may be withdrawn through a suitable faucet or other preferred means. I prefer, however, to provide a separate vessel G for the liquid and place the same upon the partition F. The vessel G is preferably made to exactly fit the compartment formed above the partition F, and the same may be provided with a suitable handle and opening for conveniently receiving and removing the contents. In the lower part of the section B, under the partition F, is placed the removable lamp H, and it will be understood that any preferred form of lamp may be used, though the form described will, it is thought, be found preferable to others both from a consideration of safety and economy. The lamp H consists of a cup-shaped body provided with the end handle $h$. Within the cup thus divided I erect the standard I. (Shown in Fig. 2.) This standard consists of a piece of sheet metal having its lower end $i$ bent at right angles, said bent section being adapted to pass under the anchor-plate J, secured to the bottom of the cup. The upper end of the holder I is provided with the folded arms $i'$, the obvious purpose of which is to receive and hold the wick K before and after the same has been ignited. The lower end of the wick will reach down into the oil provided in the bottom of the cup, and in order that the wick may be easily adjusted I provide the pivoted lever L. This lever has the bifurcated end $l$, the arms $l'$ being pivoted to either side of the wick-support I, while one of said arms carries the upwardly-inclined end $l''$, adapted to reciprocate vertically in the slot between the ends of the arms $i'$ when the free end of the lever is raised or lowered, and by such means the wick is raised to the desired point. The lower half of section B, in which the lamp is placed, is provided with an opening having a suitable door N, provided with the latch $n'$, by which it is secured. The door N is also provided with the draft-regulator O, adapted to be swung upon its pivot $o$ to either side of the opening P, provided in the door. The opposite end of the lamp-compartment is provided with the chimney or flue-opening Q, the obvious purpose of which is to permit the exit of the products of combustion.

When the various parts herein described have been assembled or placed in their operative positions, tallow or other oleaginous substance may be placed within the cup forming the body of the lamp and the wick adjusted in the desired position and ignited. Before placing the vessel G in position upon the horizontal partition F, I prefer to add to the compartment formed by said division a small quantity of water, that the solder holding the parts together may be protected from the heat of the lamp. When the lid R of the bucket is placed in position and the lamp lighted, it will be seen that the temperature of the contents of the box will soon be raised to the desired point. The upper side of the lid may be provided in the usual manner with the cylindrical compartment S, the open end of which may be inclosed by an ordinary cup T.

Believing that the construction of my invention and the object thereof will be fully understood and appreciated from the foregoing description, further reference is dispensed with.

Having thus described my invention, what I claim, and desire to secure by Letters Patent, is—

1. In a lunch-bucket, the combination, with the body divided into convenient compartments, substantially as shown, of the liquid-receptacle G, the portable lamp H, having a cup-shaped body, and the wick-support I, mounted in the bottom of said cup, said support consisting of the folded arms $i'$ and having the pivoted wick-raising lever secured thereto, substantially as set forth.

2. The combination, in a lunch-bucket, of the lamp H, having a suitable lid by which it is inclosed when not in use, with the wick-support I, erected in the bottom of the cup H and having secured thereto the pivoted bifurcated lever adapted to adjust the wick in the desired position, substantially as set forth.

In testimony whereof I affix my signature in presence of two witnesses.

ANTON MILLER.

Witnesses:
G. C. PRENTISS,
NELLIE O'BRIEN.